Patented Dec. 5, 1939

2,181,919

UNITED STATES PATENT OFFICE 2,181,919

ALKALI METAL CELLULOSATES

Philip C. Scherer, Jr., Blacksburg, Va., assignor to North American Rayon Corporation, New York, N. Y., a corporation of Delaware No Drawing. Application November 29, 1937, Serial No. 177,156

23 Claims. (Cl. 260—233)

This invention relates to cellulose derivatives and to the preparation of the same. More particularly, the invention relates to the preparation of alkali metal cellulosates which are cellulose derivatives containing up to three atoms of alkali metals per $C_6$ unit of cellulose.

Alkali cellulose has attained commercial importance, its uses including that of intermediates in the preparation of other cellulose derivatives such as cellulose xanthate. Heretofore alkali cellulose, such as soda cellulose, has been prepared by treating cellulose with caustic soda. In this process it is necessary to use the caustic in large excess and the presence of water in the product is objectionable for some uses.

The object of the present invention is to provide an improved process of preparing alkali metal cellulosate and the object of the invention includes the preparation of anhydrous alkali metal alcoholates of cellulose.

I have discovered that the above mentioned objects may be readily accomplished by contacting cellulose which has been carefully dried with metallic alkali metal dissolved in liquid ammonia. Under these conditions one atom of hydrogen per $C_6$ unit of cellulose is easily and rapidly replaced by one atom of alkali metal, preferably sodium or potassium. Succeeding atoms of alkali metal are substituted more slowly, due possibly to the formation of a film of rather insoluble alkali metal cellulosate about the fibres or, perhaps, to the lesser affinity of secondary alcohol groups for the alkali metal. In any event, I find that not more than three atoms of alkali metal per $C_6$ unit of cellulose are introduced into the molecule regardless of the excess employed.

By suitable variation in the ratio of alkali metals to cellulose, I am enabled to prepare cellulosates containing one, two or three atoms of sodium or one, two or three atoms of potassium or lower or intermediate ratios for each $C_6$ unit of cellulose.

I have examined the products of the reaction and find that they differ from the alkali cellulose prepared by methods previously known, but have in common with such alkali cellulose the property of reacting with carbon bisulfide to form xanthate completely soluble in water and alkali, also the property of reacting with organic halides.

The invention is illustrated in the following examples which are presented by way of illustration and not by way of limitation.

Example 1

Carefully purified and dried absorbent cotton (0.3556 g.) was placed in a small glass reaction tube suspended in a bath of liquid ammonia. Dried ammonia vapor was then condensed on the cellulose in the tube and 0.0505 gram of sodium (1 atom of sodium per $C_6$ unit of cellulose) was dropped into the reaction tube from a side tube above the level of the liquid ammonia condensed on the cellulose. A vigorous reaction ensued and the characteristic blue color of free sodium dissolved in liquid ammonia gradually disappeared. The total amount of hydrogen evolved was collected as a measure of the amount of sodium introduced into the cellulose. The atoms of hydrogen found per atom of sodium added was 1.020.

Example 2

In the following example wood pulp cellulose was used as the source of cellulose. Dried cellulose 0.1948 gram was reacted in the same manner as in Example 1 with 0.0551 gram of metallic sodium which was 1.99 atoms of sodium per $C_6$ unit of cellulose. The quantity of hydrogen evolved was 0.934 atom per atom of sodium added.

Example 3

In another experiment 0.1358 gram of cellulose regenerated from viscose solution was treated in liquid ammonia with 0.0564 gram of sodium (2.93 atoms of sodium per $C_6$ unit of cellulose) and the ratio of atoms of hydrogen evolved and sodium added was in this case 0.925:1.

From the foregoing description, including the above examples, it will be seen that alkali metal cellulosates can be prepared by the method set forth. However, it may sometimes be desired that the cellulose be given a preliminary treatment though to do so is not essential. For instance, the reaction may be promoted by causing the cellulose to be given a preliminary swelling treatment by the use of certain salts. I have found that salts such, for example, as sodium iodide, potassium iodide and sodium thiocyanate, when dissolved in liquid ammonia, are effective for the swelling of the cellulose and thus in promoting the reaction. The following is an example of such swelling treatment.

Example 4

Fifteen grams of dry wood cellulose is suspended in about 300cc. of liquid ammonia in which is dissolved 25 g. of sodium iodide. The cellulose is swollen considerably by the sodium iodide and liquid ammonia. To the mixture is added 6.49 g. metallic sodium. The reaction is complete after 3½ hours as shown by the disappearance of the blue color of the dissolved sodium and the cessation of the evolution of hydrogen. The sodium cellulosate is purified by washing with liquid ammonia to remove the sodium iodide, and then dried in the absence of moisture and air.

The swelling agents referred to herein should be ones that are sufficiently soluble in liquid ammonia and that do not react with the ammonia or with the other ingredients present or products formed. Alkali metal- and ammonium-halides, -thiocyanates or -nitrates are examples of suitable swelling agents. The alkali metals referred to in this application include sodium, potassium, lithium, rubidium and caesium, and the halides include the chlorides, iodides, bromides and fluorides.

The products of my new reaction find many uses in industry. For example, many cellulose products have hitherto been prepared from alkali cellulose, which in turn has been made by treating cellulose with concentrated caustic soda or caustic potash. One example of such processes is the preparation of ethyl cellulose, and similar products such as benzyl cellulose, by reaction of alkali cellulose with ethyl chloride and with benzyl chloride, respectively. In reactions of this type the presence of water and of sodium hydroxide or potassium hydroxide is a definite disadvantage because they react with the ethyl chloride, or benzyl chloride, or other similar reagent, hydrolyzing it to the alcohol which is much less valuable and can take no part in the formation of the desired ethyl cellulose or similar product.

My new product, alkali metal cellulosate, on the other hand, contains substantially no water or caustic alkali, and is therefore very useful for the preparation of cellulose derivatives, particularly cellulose ethers, by reaction with organic halides containing a reactive halogen. For example, I may use the alkyl halides or substituted alkyl halides, or aromatic halides in which the halogen group is readily reactive, or acid halides, such as acetyl chloride and benzoyl chloride. An example of the foregoing, using benzyl chloride, is as follows:

*Example 5*

7.6 parts of weight of dried cotton linters were treated with 5.9 parts of weight of potassium in 200 parts by weight of liquid ammonia. The materials were allowed to stand in contact in the reaction vessel for 3¼ hours, after which the excess liquid ammonia was decanted and the cellulosic compound placed in a desiccator over sulphuric acid. Hydrolysis of the product showed that it contained 28.5 per cent potassium or approximately two atoms per $C_6$ unit of cellulose.

Five parts by weight of the product obtained in Example 5 above was placed in a flask with 25.8 parts by weight of dry benzyl chloride, and protected from moisture in the air by a drying tube containing calcium chloride. The flask was heated on a steam bath and was shaken occasionally during a period of 20 hours. The product was then washed several times with alcohol and water, and finally dried. The product was only slightly soluble in organic solvents but was completely insoluble in cuprammonium solution, which indicates that it was no longer cellulose. Presumably it was a benzyl cellulose of a low degree of benzylation.

Where it is desired to prepare ethyl cellulose the alkali metal cellulosate is treated with an excess of ethyl chloride and allowed to stand at room temperature or heated for several hours. The product is insoluble in cuprammonium solution, and its solubility in organic solvents, such as toluol or benzol, will depend on the degree of ethylation attained.

In preparing my new alkali metal cellulosates any of the well known types of cellulose may be used, such as wood cellulose, regenerated cellulose or purified ramie, as well as the purified cotton linters indicated in the above examples and partially substituted derivatives of cellulose containing at least one hydrogen atom replaceable by alkali metals. In using the term cellulosic material in the appended claims, it is intended to include such substances.

In carrying out the reactions indicated above, it is important, during the reaction and afterwards, to protect the contents of the reaction vessel from moisture and air since the alkali metal cellulosates are very sensitive to hydrolysis and oxidation. The process may be carried out with moisture present but at a sacrifice of alkali metal and anhydrous cellulosate.

It is preferred to carry out the reactions referred to herein, where liquid ammonia is used, at about the boiling point of the liquid ammonia at atmospheric pressure, i. e., at about −33° C. They may, however, be conducted at higher or lower temperatures, in which case it is only necessary to carry out the process at increased pressures for higher temperatures and, if desired, at lower pressures for lower temperatures. If tempeatures below the boiling point of ammonia are desired, the reaction container may be cooled by means of a liquid boiling at a lower temperature than ammonia.

The alkali metal cellulosate is a white fibrous material similar in physical form to the original cellulose. It is extremely sensitive to oxidation by air and to decomposition by moisture. Under certain conditions the addition of even a drop of water will cause violent decomposition with a charring of the entire mass. The cellulose in the anhydrous alkali metal cellulosate is not degraded appreciably as is shown by the fact that an original cellulose had an apparent cuprommonia viscosity of 324 centipoises whereas the cellulose regenerated from the anhydrous cellulosate had a viscosity of 286 centipoises. This is another respect in which the alkali metal cellulosate differs from alkali cellulose. The attempt to prepare anhydrous alkali cellulose by evaporating water from the known types of alkali cellulose results in serious degradation of the cellulose as is indicated by extreme reduction in viscosity.

As many apparently widely different embodiments of this invention may be made without departing from the spirit thereof, it is to be understood that I do not limit myself to the foregoing examples, proportions or descriptions, except as indicated in the following patent claims.

This application is a continuation in part of my copending application Serial No. 670,039, filed May 8, 1933. No claim is made herein to the processes and products in which the product of the present application may be used, such being the subject matter of my applications Serial Nos. 670,040 and 670,041, filed May 8, 1933 and Serial No. 177,157, filed November 29, 1937.

I claim:
1. A process of bringing about a reaction between cellulosic material and an alkali metal, which comprises treating cellulosic material with a solution of an alkali metal in liquid ammonia, said treatment being conducted at about the temperature of the boiling point of liquid ammonia at atmospheric pressure.

2. A process of bringing about a reaction between cellulosic material and an alkali metal, which comprises treating cellulosic material with a solution of an alkali metal in liquid ammonia, said treatment being conducted in a substantially anhydrous atmosphere and at about the temperature of the boiling point of liquid ammonia at atmospheric pressure.

3. As a new composition of matter, a substantially anhydrous compound of cellulose and an alkali metal containing from one to three atoms of alkali metal for each $C_6$ unit of cellulose.

4. As a new composition of matter, a substantially anhydrous compound of cellulose and metallic sodium containing from one to three atoms of metallic sodium for each $C_6$ unit of cellulose.

5. As a new composition of matter, a substantially anhydrous compound of cellulose and metallic potassium containing from one to three atoms of metallic potassium for each $C_6$ unit of cellulose.

6. An alkali metal cellulosate with the formula $(C_6H_9O_5)x$, where $x$ may be sodium or potassium.

7. An alkali metal cellulosate with the formula $(C_6H_8O_5)x_2$, where $x$ may be sodium or potassium.

8. An alkali metal cellulosate with the formula $(C_6H_7O_5)x_3$, where $x$ may be sodium or potassium.

9. A process of bringing about a reaction between a cellulosic material and an alkali metal, which comprises treating the cellulosic material with a solution of an alkali metal in liquid ammonia, in the presence of a compound tending to cause the cellulosic material to swell.

10. A process of bringing about a reaction between a cellulosic material and an alkali metal, which comprises treating the cellulosic material with a solution of an alkali metal in liquid ammonia, in the presence of one or more salts of the group consisting of alkali metal or ammonium, halides, thiocyanates or nitrates.

11. The process of bringing about a reaction between cellulose and an alkali metal of the group consisting of sodium and potassium which comprises treating substantially anhydrous cellulose with a solution of an alkali metal in liquid ammonia, in the presence of sodium iodide.

12. The process of bringing about a reaction between cellulose and an alkali metal which comprises treating substantially anhydrous cellulose with a solution of an alkali metal in liquid ammonia, in the presence of sodium iodide.

13. A process of bringing about a reaction between a cellulosic material and an alkali metal, which comprises treating the cellulosic material with an alkali metal in liquid ammonia.

14. A process of bringing about a reaction between cellulose and an alkali metal which comprises treating cellulose with an alkali metal in liquid ammonia under substantially anhydrous conditions.

15. The process of bringing about a reaction between cellulose and an alkali metal of the group consisting of sodium and potassium which comprises treating substantially anhydrous cellulose with a solution of the alkali metal in liquid ammonia, in the presence of potassium iodide.

16. The process of bringing about a reaction between cellulose and an alkali metal of the group consisting of sodium and potassium which comprises treating substantially anhydrous cellulose with a solution of the alkali metal in liquid ammonia, in the presence of sodium thiocyanate.

17. The process of bringing about a reaction between cellulose and an alkali metal which comprises treating substantially anhydrous cellulose with a solution of an alkali metal in liquid ammonia, in the presence of potassium iodide.

18. The process of bringing about a reaction between cellulose and an alkali metal which comprises treating substantially anhydrous cellulose with a solution of an alkali metal in liquid ammonia, in the presence of sodium thiocyanate.

19. A process of bringing about a reaction between cellulose and an alkali metal, which comprises treating cellulose with a solution of an alkali metal in liquid ammonia, said treatment being conducted at about the temperature of the boiling point of liquid ammonia at atmospheric pressure.

20. A process of bringing about a reaction between cellulose and an alkali metal, which comprises treating cellulose with a solution of an alkali metal in liquid ammonia, said treatment being conducted in a substantially anhydrous atmosphere and at about the temperature of the boiling point of liquid ammonia at atmospheric pressure.

21. A process of bringing about a reaction between cellulose and an alkali metal, which comprises treating the cellulose with a solution of an alkali metal in liquid ammonia, in the presence of a compound tending to cause the cellulose to swell.

22. A process as defined in claim 13 in which the alkali metal is one or more of the group consisting of sodium and potassium.

23. A process as defined in claim 14 in which the alkali metal is one or more of the group consisting of sodium and potassium.

PHILIP C. SCHERER, Jr.